(12) United States Patent
Westcott et al.

(10) Patent No.: US 12,275,452 B1
(45) Date of Patent: Apr. 15, 2025

(54) JOINT MOUNTING KIT

(71) Applicant: FEDERAL-MOGUL MOTORPARTS LLC, Southfield, MI (US)

(72) Inventors: Benjamin H. Westcott, Maryland Heights, MO (US); Dustin Schrieber, Waterloo, IL (US); Steven D. Schmitt, Maryland Heights, MO (US); Seth Englebright, Maryland Heights, MO (US); Roger G. Sellers, Arnold, MO (US)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 0 days.

(21) Appl. No.: 18/380,615

(22) Filed: Oct. 16, 2023

(51) Int. Cl.
*B62D 17/00* (2006.01)

(52) U.S. Cl.
CPC ..................... *B62D 17/00* (2013.01)

(58) Field of Classification Search
CPC ............ B60G 7/005; B60G 2200/4622; F16B 5/0225
See application file for complete search history.

(56) References Cited

U.S. PATENT DOCUMENTS

| | | | |
|---|---|---|---|
| 3,572,677 A | 3/1971 | Damon | |
| 4,613,251 A | 9/1986 | Bellamy et al. | |
| 5,052,711 A | 10/1991 | Pirkey et al. | |
| 5,443,281 A | 8/1995 | Burkard et al. | |
| 6,446,991 B1 | 9/2002 | Klais | |
| 6,676,142 B2 | 1/2004 | Allman | |
| 6,688,616 B1 | 2/2004 | Ziech | |
| 7,475,945 B2 | 1/2009 | Reubeuze et al. | |
| 10,625,778 B2 | 4/2020 | Buchwitz et al. | |
| 10,994,580 B1 * | 5/2021 | Ryshavy | ............... B62D 17/00 |
| 11,254,176 B1 * | 2/2022 | Ryshavy | ............... B60G 7/005 |
| 2017/0282662 A1 * | 10/2017 | North | ................. F16C 11/0695 |

FOREIGN PATENT DOCUMENTS

| | | | |
|---|---|---|---|
| CA | 3087360 A1 * | 2/2021 | ............. B60G 7/005 |
| CN | 211371001 U | 8/2020 | |
| JP | H09287138 A | 11/1997 | |
| JP | 2012167523 A | 9/2012 | |
| JP | 6861091 B2 | 4/2021 | |
| KR | 20060063142 A | 6/2006 | |
| KR | 101314344 B1 | 10/2013 | |

* cited by examiner

*Primary Examiner* — Nicole T Verley
(74) *Attorney, Agent, or Firm* — Reising Ethington PC (57) ABSTRACT

A joint mounting kit comprises a mounting plate and slugs to enhance adjustability of the vehicle suspension system. A fastener is configured to be received in the mounting hole to at least partially retain the mounting plate to a vehicle component, and a slug is configured to be received in the mounting hole with the fastener. The slug has a slug height that is equal to or less than a height of the mounting hole interior wall. In another implementation, the joint mounting kit comprises a plurality of slugs, with two or more slugs having different wheel adjustment dimensions. In yet another implementation, the slug has a tool removal recess to help facilitate slug removal.

16 Claims, 5 Drawing Sheets

JOINT MOUNTING KIT

TECHNICAL FIELD

This invention generally relates to vehicle components and, in particular, to joint mounting in steering and suspension systems.

BACKGROUND

In some instances, the camber and/or caster of a vehicle tire needs to be adjusted when the suspension is worn out. This camber and/or caster adjustment can help optimize the vehicle's alignment. One way to accomplish this is to vary the positioning of the ball joint between the control arm and the steering knuckle. In other solutions, where there is a mounting plate to help accommodate the coupling between the joint and the control arm, configurational changes may be made to the structure of the mounting plate. These configurational changes may negatively impact the clearance and space needed for easier installation. Accordingly, a more structurally streamlined mounting arrangement is desirable.

SUMMARY

According to one embodiment, there is provided a joint mounting kit comprising a mounting plate having a mounting hole. The mounting plate is configured to at least partially retain a joint and includes a mounting hole that has a mounting hole interior wall. At least a portion of the mounting hole interior wall is at least partially planar. A fastener is configured to be received in the mounting hole to at least partially retain the mounting plate to a vehicle component, and a slug is configured to be received in the mounting hole with the fastener. The slug has a slug height that is equal to or less than a height of the mounting hole interior wall.

In some embodiments, the mounting hole is an elongated slot spanning from a first end to a second end.

In some embodiments, the first end and the second end are both rounded, and a length of the elongated slot is greater than a radius of the first end or a radius of the second end.

In some embodiments, there is a second slug, and the slug has a first wheel adjustment dimension and the second slug has a second wheel adjustment dimension. The second wheel adjustment dimension is less than the first wheel adjustment dimension.

In some embodiments, each wheel adjustment dimension is a camber adjustment dimension.

In some embodiments, the camber adjustment dimension facilitates a 0.1-1°, inclusive, camber adjustment.

In some embodiments, there is a third slug and a fourth slug.

In some embodiments, the third slug has the second wheel adjustment dimension and the fourth slug has the first wheel adjustment dimension.

In some embodiments, there is a socket joint coupled to the mounting plate.

In some embodiments, the slug has an outer sidewall, and the outer sidewall has a draft angle.

In some embodiments, the slug includes a tool removal recess.

In some embodiments, the slug includes an outer sidewall configured to abut the mounting hole and an inner sidewall that at least partially defines the tool removal recess.

In some embodiments, a height of the inner sidewall is less than a height of the outer sidewall.

In some embodiments, both the outer sidewall and the inner sidewall are at least partially U-shaped.

In some embodiments, the slug is configured to be reoriented in order to adjust a camber or a caster amount.

In some embodiments, the slug has an outer sidewall and the outer sidewall is at least partially bowed outward or projecting.

In some embodiments, the slug has a plurality of tabs configured to fit in a keyway in the mounting hole.

In accordance with one embodiment, there is provided a joint mounting kit comprising first slug having a first wheel adjustment dimension, a second slug having a second wheel adjustment dimension, and a third slug having a third wheel adjustment dimension. The second wheel adjustment dimension and the third wheel adjustment dimension are the same, and the first wheel adjustment dimension is greater than the second wheel adjustment dimension or the third wheel adjustment dimension.

In some embodiments, there is a socket joint and a mounting plate coupled to the socket joint. The first slug is configured to fit in the mounting plate with a first fastener, the second slug is configured to fit in the mounting plate with a second fastener, and the third slug is configured to fit in the mounting plate with the second fastener.

In accordance with one embodiment, there is provided a joint mounting kit comprising a slug having an outer sidewall configured to fit within a mounting hole for a socket joint. The slug has a tool removal recess having an inner sidewall. The inner sidewall at least partially defines the tool removal recess, and a height of the outer sidewall is greater than a height of the inner sidewall.

In some embodiments, the slug includes a fastener receiving wall adjacent the outer sidewall and a tool receiving wall adjacent the inner sidewall.

In some embodiments, the fastener receiving wall and the tool receiving wall have the same shape.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The joint mounting kits described herein can provide for improved camber and/or caster adjustment, particularly with regard to camber adjustment for a vehicle steering and suspension system. In accordance with some embodiments, the joint mounting kits include a plurality of different slugs that are configured to fit into mounting holes of a mounting plate for a socket joint. The slugs are arranged to more conformally fit within the tight constraints of the vehicle suspension system, while maintaining ease of installation and removal. Additionally, the mounting plate configuration is more streamlined while providing for increased adjustability over other arrangements, such as those with circular or concentric insert arrangements. Furthermore, given that the slugs of the joint mounting kit cooperate with the mounting plate of the socket joint, instead of with the control arm, the joint mounting kit can work with a larger variety of suspension systems. Accordingly, the joint mounting kits described herein can satisfy more performance requirements without complicating the suspension system structure or the joint assembly process.

Figure 1:
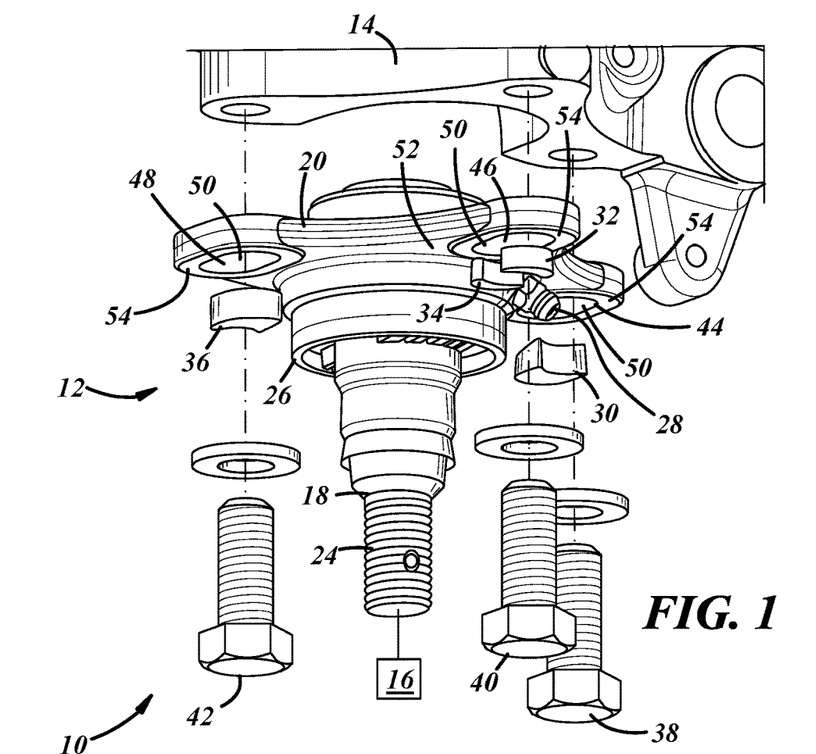
FIG. 1 is a partial, exploded view of a suspension assembly showing a joint mounting kit according to one embodiment.

FIG. 1 is an exploded view of one embodiment of a suspension system 10 having a joint mounting kit 12 configured to couple a control arm 14 to a steering knuckle 16. In the illustrated embodiment, the joint mounting kit 12 includes a socket joint 18 and a mounting plate 20, which are configured to allow for relative movement between the control arm 14 and the steering knuckle 16. The socket joint 18 is advantageously a ball joint 22, with the stud portion 24 and a ball portion recessed within the housing 26 which is surrounded by the mounting plate 20. In some implementations, the housing 26 may be an integral part of the mounting plate 20. It is possible, however, for the joint mounting kit 12 to be alternately arranged or used in other configurations or implementations. Further, features relating to the mounting kit 12 may be useful in other joint applications. Accordingly, it is possible to manufacture and/or assemble alternately configured suspension and/or steering components in accordance with the teachings herein. For example, the joint 18 may include any moveable socket configuration, such as those without a ball stud, and is not limited to the explicitly illustrated joint shown in the figures and described herein. Additionally, other features may be included, such as the illustrated grease fitting 28 and/or a dust boot, to cite a few examples.

Figure 2:
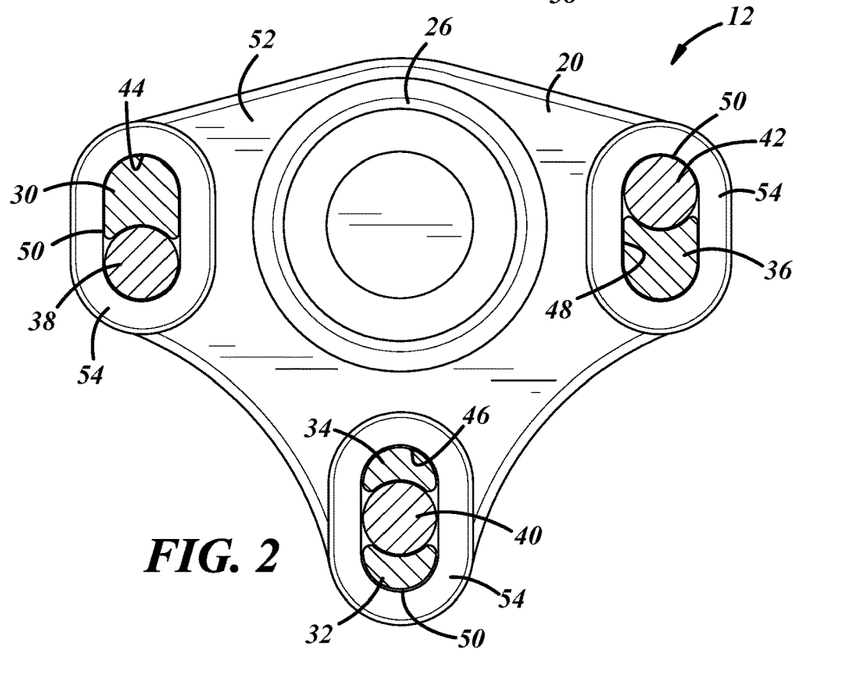
FIG. 2 is a simplified, schematic view of the bottom side of the assembly of FIG. 1, showing various arrangements for the joint mounting kit.

With reference to FIGS. 1 and 2, the joint mounting kit 12 includes a plurality of slugs, including a first slug 30, a second slug 32, a third slug 34, and a fourth slug 36. Additional slugs are advantageously included depending on the arrangement of the mounting plate 20. For example, the kit 12 for the illustrated embodiment would likely include five additional slugs: one additional slug that is dimensionally the same as the first slug 30 and the fourth slug 36, and four additional slugs that are dimensionally the same as the second slug 32 and the third slug 34. As will be detailed further below, the number and configuration of the slugs may vary depending on a number of factors, such as the size and configuration of the mounting plate 20, the size and configuration of the individual slugs, the amount of desired adjustability to the suspension system 10, etc.

The slugs 30, 32, 34, 36 are configured to help maintain the position of fasteners 38, 40, 42 within their respective mounting holes 44, 46, 48 in the mounting plate 20. The fasteners 38, 40, 42 are bolts with washers in this embodiment, but it should be understood that other fastener types are certainly possible. Given the size and shape of the slugs 30, 32, 34, 36 and the mounting holes 44, 46, 48, the fasteners 38, 40, 42 can be positionally varied to adjust the positioning of the joint 18 relative to the control arm 14. FIGS. 1 and 2 schematically show the various positions for the slugs 30, 32, 34, 36 and the fasteners 38, 40, 42 within this particular embodiment, but it should be understood that in practice, it is likely that the slug configuration within each mounting hole 44, 46, 48 will likely be the same (e.g., all larger slugs oriented toward one side or another side with only one slug per hole, all smaller slugs to orient the fasteners in a center region of each hole 44, 46, 48, (more than one per hole) etc.). In an advantageous embodiment, the mounting kit 12 comes with a plurality of slugs 30, 32, 34, 36, a plurality of fasteners 38, 40, 42, the joint 18, and the mounting plate 20. The slugs 30, 32, 34, 36 are advantageously sized to allow a variety of positions in each mounting hole 44, 46, 48 that correspond to between a minimum and a maximum desired amount of camber, for example.

Figure 3:
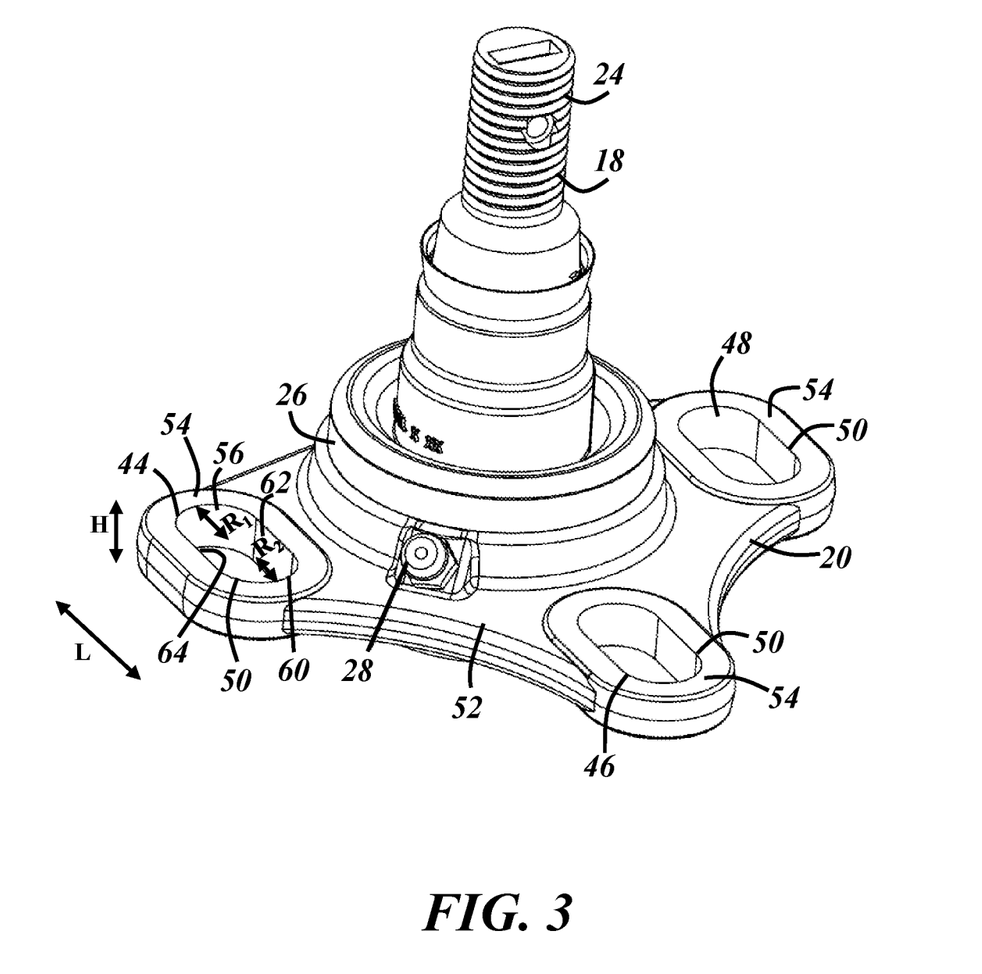
FIG. 3 shows the socket joint and mounting plate of the joint mounting kit of FIGS. 1 and 2.

FIG. 3 shows the mounting holes 44, 46, 48 of the mounting plate 20. In this embodiment, each mounting hole 44, 46, 48 is an elongated slot 50, but it is possible for the slots to be alternately shaped or configured (e.g., cross-shaped from two adjoining elongated slots, Y-shaped, rect-angular-shaped, a diagonally oriented slot, or other shapes/sizes). Additionally, while advantageous for the holes 44, 46, 48 to all have the same shape, as this can help with slug accommodation, it is also possible for one or more holes to be different than the others. The holes 44, 46, 48 are joined integrally with a body portion 52, which is integrally formed with the housing 26. Around each hole 44, 46, 48 is a planar rim 54 which wholly surrounds each hole. This structure, as opposed to mounting plates that have projections or the like adjacent one or more holes, can be easier to manufacture and allow for more space adjacent the mounting kit 12. The mounting plate 20 serves as an interface between the joint 18 and another vehicle component (e.g., the control arm 14), via the mounting holes 44, 46, 48 and the fasteners 38, 40, 42.

For clarity of the drawings, the features of the mounting hole 44 are numbered in FIG. 3 and described herein, and these teachings are also applicable to the other mounting holes 46, 48. The mounting hole 44 has a mounting hole interior wall 56 that extends down from the planar rim 54 and spans between both sides of the body portion 52 of the mounting plate 20. The mounting hole interior wall 56 generally defines the elongated slot or keyway 50, which has a first curved end 58, a second curved end 60, and opposing planar portions 62, 64 between the first and second ends 58, 60. The slot 50 has a length L between the first end 58 and the second end 60 and a height H of the mounting hole interior wall 56. Advantageously, to provide enhanced scope of positioning, the length L of the elongated slot 50 is greater than a radius R1 of the first end 58 or a radius R2 of the second end. In some embodiments, the length of each opposing planar portion 62, 64 is equal to or greater than R1 or R2 to increase the range of available positions.

Figure 4:
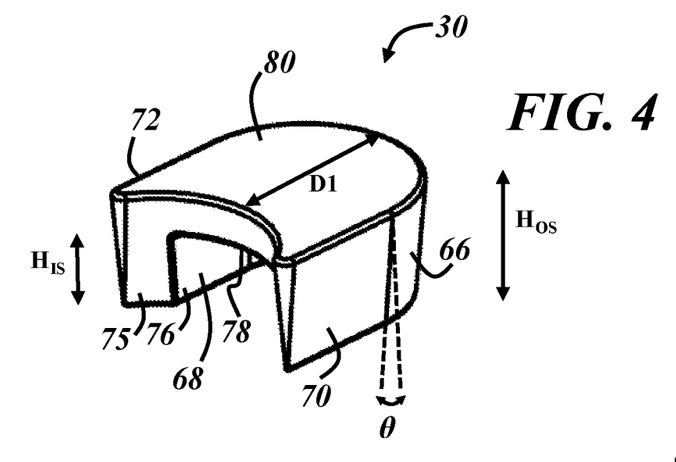
FIG. 4 shows a first slug from the joint mounting kit of FIGS. 1-2.
Figure 5:
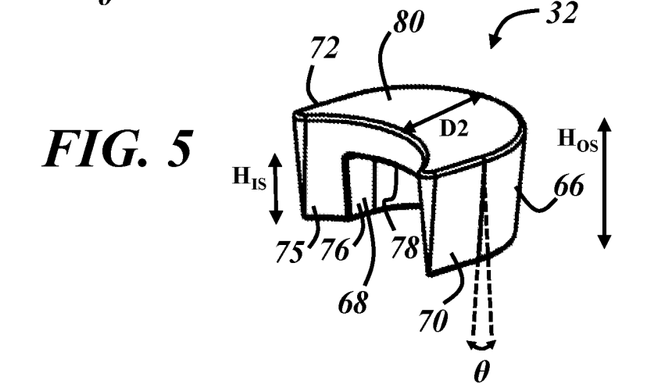
FIG. 5 shows a second slug from the joint mounting kit of FIGS. 1-2.

Again, for clarity of the drawings, the features of the slugs 30, 32 are numbered in FIGS. 4 and 5 and described herein respectively, and these teachings are also applicable to the other slugs 34, 36. The slugs 30, 32 can be made of a polymer-based material, and in one embodiment, is made with polyamide reinforced with 30-33% glass fiber. This material, or the use of other flexible polymers, may allow for easier installation within the metal-based mounting plate 20. In other embodiments, metal or carbon fiber could be used for the slugs 30, 32, to cite a few examples. Other operable materials are certainly possible.

With reference to FIG. 4, there is shown the slug 30, which is configured to be larger in multiple dimensions than the slug 32 shown in FIG. 5. The first slug 30 in FIG. 4 has a first wheel adjustment dimension D1, and the second slug 32 in FIG. 5 has a second wheel adjustment dimension D2. Additionally, the third slug 36 has a third wheel adjustment dimension that is equal to the second wheel adjustment dimension D2, and the fourth slug 38 has a fourth wheel adjustment dimension that is equal to the first wheel adjustment dimension D1. The wheel adjustment dimensions are dimensions of the slug, which when varied, change the position of the fastener within the mounting hole in order to change the caster/camber of the suspension system 10. In some embodiments, the wheel adjustment dimension of the slug is the dimension, that when varied, changes an available length L of the mounting hole for accommodating a fastener. Advantageously, the second and third slug 32, 34 have the same wheel adjustment dimension D2, as it allows for both to be used in the same mounting hole 46 and centrally locate the fastener 40 with respect to the elongated slot 50. The slugs 30, 32, 34, 36 may have a marking, alternate colors, or the like, to indicate the various wheel adjustment dimensions D1, D2. Additionally, while two different variations for the wheel adjustment dimension D1, D2, are shown, it is possible in the joint mounting kit 12 to have more slugs having different wheel adjustment dimensions, which will likely depend on the configuration of the mounting plate 20. In the illustrated embodiment, the ratio of D2:D1 is about 1:1.35, and may be in the range of about 1:1.25-1:2 in some implementations. This can be changed depending on the specifications of the suspension system 10.

The wheel adjustment dimension D1, D2 is preferably a camber adjustment dimension. Accordingly, inclusion of different slugs 30, 32 having a different wheel dimension D1, D2 will change the camber of the vehicle tire. In the illustrated configuration, the camber adjustment dimension facilitates a 0.1-1°, inclusive, camber adjustment. More preferably, the amount of camber adjustment is 0.3-0.6°, inclusive. More broadly, the wheel adjustment dimension changes the camber of the vehicle tire between 0-1°, with 0° typically equating to the factory position. An advantage of the present joint mounting kit 12 is that it allows the joint 18 to be positioned in accordance with the original OE or factory specifications, and then this can be modified depending on the desired specifications of the vehicle suspension system 10. Generally, the minimum and maximum camber adjustment positions will be on opposite sides of each mounting hole 44, 46, 48, particularly when the hole is configured as an elongated slot 50. However, this may vary depending on the configuration of the mounting plate 20.

As shown in FIGS. 4 and 5, each slug 30, 32 has an outer sidewall 66 that has an outer sidewall height Hos, and an inner sidewall 68 that has an inner sidewall height His. In some embodiments, the Hos and the His between the different slugs 30, 32 is the same. Advantageously, the Hos is equal to or less than the height H of each mounting hole 44, 46, 48. If the Hos varies along the length of the outer sidewall 66, the Hos can be measured at its longest extent (same with His). Having Hos less than the height H of the mounting holes 44, 46, 48 provides more of a flush-mount arrangement for each slug, which can help address matching issues better than adjustment mechanisms that protrude beyond the mounting hole. For example, the slugs 30, 32 can match with an OE control arm better than other joint replacement kits, and with their flush-mount arrangement, the configuration can better match the height of the original part.

The outer sidewall 66 includes opposing planar portions 70, 72 which are connected by a rounded end 74. This shape mimics the shape of the mounting holes 44, 46, 48 and can help provide a more conformal relationship to improve retention of the fasteners 38, 40, 42 in their respective positions. Having the planar portions 62, 64 on each mounting hole 44, 46, 48 and the planar portions 70, 72 on each slug 30, 32, 34, 36 helps to enhance the camber adjustment capabilities by longitudinally extending the available positions for each fastener 38, 40, 42. Additionally, in this embodiment, the outer sidewall 66 is U-shaped, which matches the U-shaped configuration of the inner sidewall 68. The outer sidewall 66 adjoins an axially extending end wall 75 which interfaces against the threaded portion of the fastener 38.

The outer sidewall 66 includes a draft angle θ to help promote installation/removal in the mounting hole 44. The draft angle θ can also make the slug 30, 32 easier to manufacture, particularly if the slug is injection molded. In the illustrated embodiment, the draft angle θ is 5°, with 1° to 10° generally being preferred. In other embodiments, the interior wall 56 of each mounting hole 44, 46, 48 in the mounting plate 20 could be tapered as well. In yet other embodiments, the outer sidewall 66 is bowed outward and flexible to promote a stronger interference fit.

The slugs 30, 32 illustrated in FIGS. 4, 5, and 7-9 include a tool removal recess 76 which can be beneficial given the tight constraints in the suspension system 10. The inner sidewall 68 at least partially defines the tool removal recess 76, along with a tool receiving wall 78. The tool receiving wall 78 opposes the main fastener receiving wall 80 that is directly adjacent the outer sidewall 66. As shown more particularly in FIG. 9, the tool removal recess 76 provides space for a tool 82 to make contact with the slug 30 on the tool receiving wall 78 to help dislodge the slug from the mounting hole 44.

Figure 6:
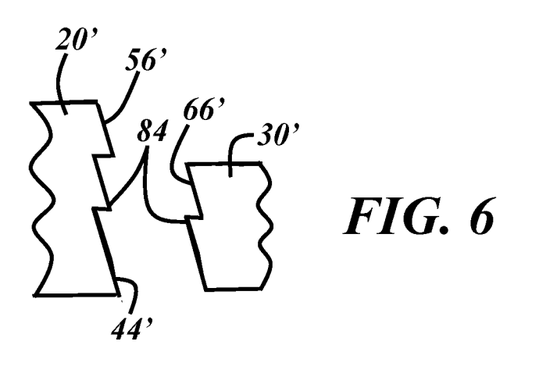
FIG. 6 shows another embodiment of a slug that can be used with a joint mounting kit.

FIG. 6 shows another embodiment of a slug 30' and a mounting plate 20'. In this embodiment, the configurations of the mounting hole interior wall 56' and the outer sidewall 66' are altered to include cooperating locking barbs or projections 84. In yet other embodiments, the slugs and/or mounting holes are alternately configured than what is particularly illustrated. To cite one example, the slug may fit in the hole but include a slotted arm or the like to rotationally alter the position of the slug with respect to the mounting hole. Other configurations are certainly possible.

Figure 7:
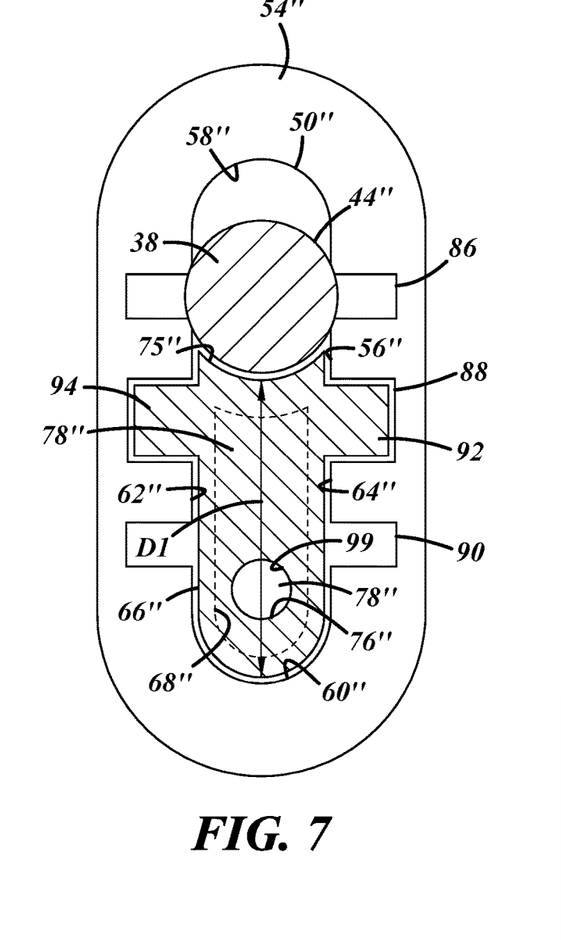
FIG. 7 shows another embodiment of a slug and mounting hole that can be used with a joint mounting kit.
Figure 8:
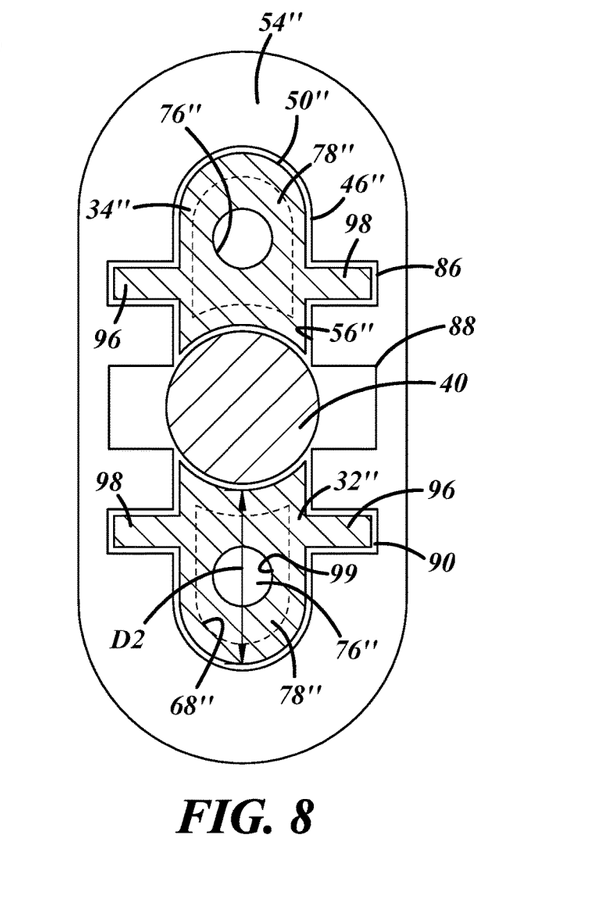
FIG. 8 shows another embodiment of slugs in the mounting hole of FIG. 7.

FIGS. 7 and 8 show a different configuration for the mounting holes 44", 46", which in this embodiment, includes a plurality of dimensionally varied keyways 86, 88, 90. The keyways 86, 88, 90 are similarly configured in both mounting holes 44", 46". This arrangement allows for a poka yoke solution for the slugs 30", 32", 34". In this embodiment, the slug 30" is equipped with tabs 92, 94 that are configured to fit in the wider keyway 88. The tabs 96, 98 are configured to fit in the narrower keyways 86, 90. This can help aid installation of the slugs 30", 32", 34". The tabs 92-98 may be simple projections off of the outer sidewall of each slug 30", 32", 34", or they may include flexible flanges or the like to help lock it in place during installation. The positioning of the tabs 92-98 as well as the keyways 86, 88, 90 may vary depending on the desired configuration. For example, keyways could be located closer at each end 58", 60" instead of spaced from the curved ends, to cite one possible implementation. The flexible tabs may also span across the outer sidewall 66, 66" such that a number of more radially outward extending tabs from the outer sidewall help keep the slugs in place. It is also feasible for the other illustrated embodiments to include flexible flanges, tabs, projections, etc.

The embodiments of FIGS. 7 and 8 also include a tool removal recess 76" having an alternate configuration, the particular features of which are labeled in FIG. 7 but applicable to FIG. 8 as well. In this embodiment, the separate recessed tool receiving wall 78" is optional, and can help give the tool removal recess 76" a more continuous inner sidewall 68". This arrangement advantageously serves to close and provide a larger surface area for the end wall 75" to interface against the threaded or axially extending portion of the fastener 38. Additionally, this embodiment of the tool removal recess 76" includes a through hole 99 that can be used to help pry the slugs from the mounting plate 20, as the tool 82 can be inserted through the hole 99 and then used to help leverage the slug from the fastener receiving wall.

Figure 9:
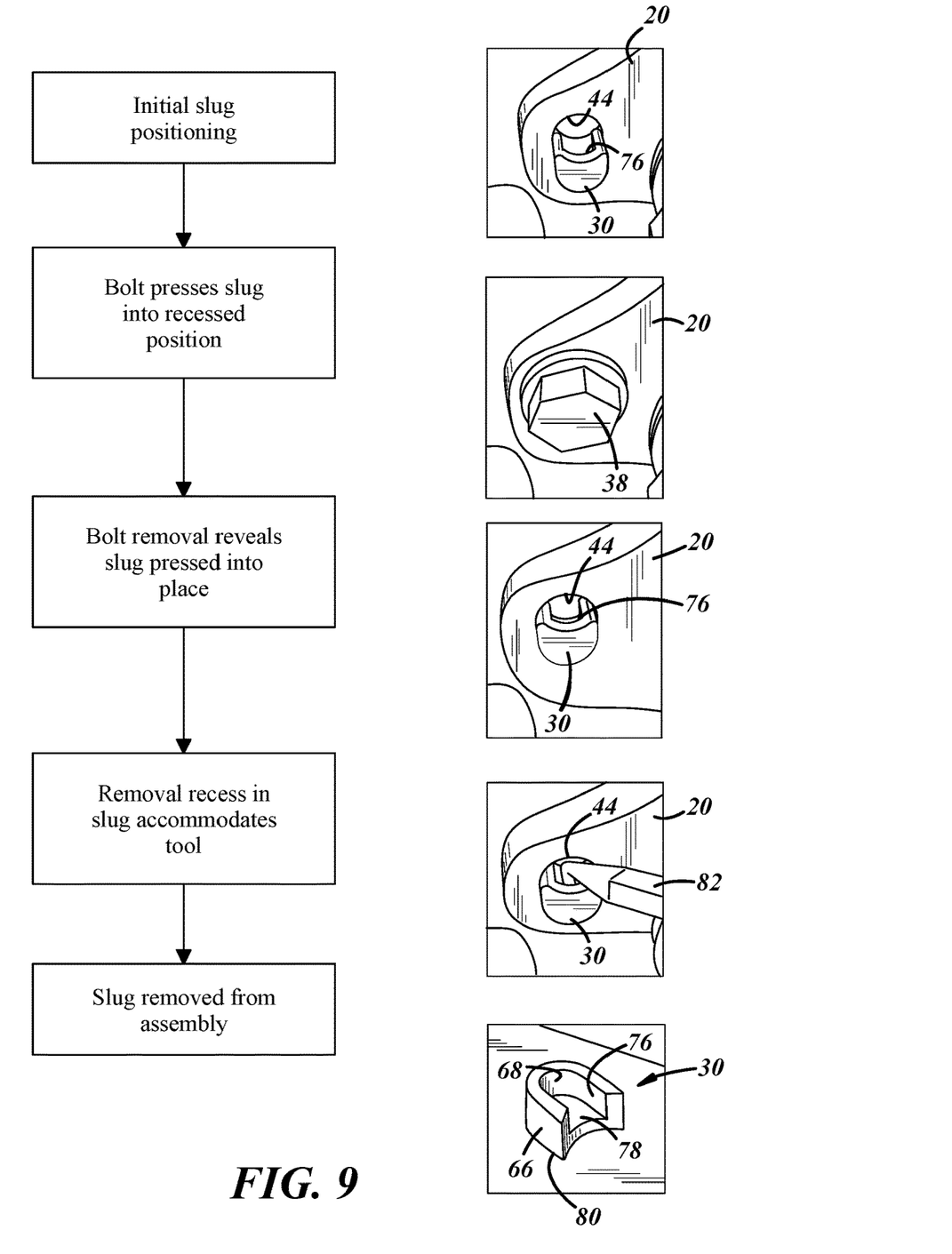
FIG. 9 is a flowchart with corresponding drawings showing an example installation and removal method for the joint mounting kit of FIGS. 1-2.

FIG. 9 is a flowchart with an example installation and removal method that can be used with the joint mounting kit 12. Initially, the slug 30 is positioned into the mounting hole 44 of the mounting plate 20. At this point, the slug 30 has an interference fit within the mounting hole 44, and may not be flush-mounted in the hole. The fastener or bolt 38 then presses the slug 30 into its fully recessed, flush-mount position. Given the inverted arrangement shown in FIGS. 1 and 9, the interference fit of the slug 30 so it is retained within the hole 44 can be beneficial when attempting to install the fastener 38. Removal of the fastener 38 reveals the slug 30 pressed into place. Then, the tool 82 can be inserted into the tool removal recess 76 to help leverage the slug 30 out of the mounting hole 44.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A joint mounting kit, comprising:
   a mounting plate having a mounting hole, wherein the mounting plate is configured to at least partially retain a joint and the mounting hole has a mounting hole interior wall, wherein at least a portion of the mounting hole interior wall is at least partially planar;
   a fastener configured to be received in the mounting hole to at least partially retain the mounting plate to a vehicle component;
   a slug configured to be received in the mounting hole with the fastener, wherein the slug has a slug height that is equal to or less than a height of the mounting hole interior wall; and
   a socket joint coupled to the mounting plate.

2. The joint mounting kit of claim 1, wherein the mounting hole is an elongated slot spanning from a first end to a second end.

3. The joint mounting kit of claim 2, wherein the first end and the second end are both rounded, and a length of the elongated slot is greater than a radius of the first end or a radius of the second end.

4. The joint mounting kit of claim 1, wherein the slug has an outer sidewall, and the outer sidewall has a draft angle.

5. The joint mounting kit of claim 1, wherein the slug is configured to be reoriented in order to adjust a camber or a caster amount.

6. The joint mounting kit of claim 1, wherein the slug has an outer sidewall and the outer sidewall is at least partially bowed outward or projecting.

7. The joint mounting kit of claim 6, wherein the slug has a plurality of tabs configured to fit in a keyway in the mounting hole.

8. A joint mounting kit, comprising:
   a mounting plate having a mounting hole, wherein the mounting plate is configured to at least partially retain a joint and the mounting hole has a mounting hole interior wall, wherein at least a portion of the mounting hole interior wall is at least partially planar;
   a fastener configured to be received in the mounting hole to at least partially retain the mounting plate to a vehicle component;
   a slug configured to be received in the mounting hole with the fastener, wherein the slug has a slug height that is equal to or less than a height of the mounting hole interior wall; and
   a second slug, wherein the slug has a first wheel adjustment dimension and the second slug has a second wheel adjustment dimension, and wherein the second wheel adjustment dimension is less than the first wheel adjustment dimension.

9. The joint mounting kit of claim 8, wherein each wheel adjustment dimension is a camber adjustment dimension.

10. The joint mounting kit of claim 9, wherein the camber adjustment dimension facilitates a 0.1-1°, inclusive, camber adjustment.

11. The joint mounting kit of claim 8, further comprising a third slug and a fourth slug.

12. The joint mounting kit of claim 11, wherein the third slug has the second wheel adjustment dimension and the fourth slug has the first wheel adjustment dimension.

13. A joint mounting kit, comprising:
   a mounting plate having a mounting hole, wherein the mounting plate is configured to at least partially retain a joint and the mounting hole has a mounting hole interior wall, wherein at least a portion of the mounting hole interior wall is at least partially planar;

a fastener configured to be received in the mounting hole to at least partially retain the mounting plate to a vehicle component; and a slug configured to be received in the mounting hole with the fastener, wherein the slug has a slug height that is equal to or less than a height of the mounting hole interior wall, wherein the slug includes a tool removal recess.

14. The joint mounting kit of claim 13, wherein the slug includes an outer sidewall configured to abut the mounting hole and an inner sidewall that at least partially defines the tool removal recess.

15. The joint mounting kit of claim 14, wherein a height of the inner sidewall is less than a height of the outer sidewall.

16. The joint mounting kit of claim 14, wherein both the outer sidewall and the inner sidewall are at least partially U-shaped.

\* \* \* \* \*